United States Patent
Rosenbaum

(10) Patent No.: US 10,545,483 B2
(45) Date of Patent: Jan. 28, 2020

(54) PRODUCTION SYSTEM HAVING ADDITIONAL FUNCTIONALITY, AND OPERATING METHOD

(71) Applicant: SIEMENS AKTIENGESELLSCHAFT, München (DE)

(72) Inventor: Björn Rosenbaum, Erlangen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 15/543,648

(22) PCT Filed: Dec. 2, 2015

(86) PCT No.: PCT/EP2015/078267
§ 371 (c)(1),
(2) Date: Jul. 14, 2017

(87) PCT Pub. No.: WO2016/113033
PCT Pub. Date: Jul. 21, 2016

(65) Prior Publication Data
US 2018/0004191 A1  Jan. 4, 2018

(30) Foreign Application Priority Data
Jan. 15, 2015  (EP) .................................. 15151294

(51) Int. Cl.
*G05B 19/4093* (2006.01)
*G05B 19/18* (2006.01)

(52) U.S. Cl.
CPC ......... *G05B 19/4093* (2013.01); *G05B 19/18* (2013.01); *G05B 2219/23013* (2013.01);
(Continued)

(58) Field of Classification Search
CPC ................ G05B 19/18; G05B 19/4093; G05B 2219/35012; G05B 2219/23013; G05B 2219/24165; Y02P 90/265
See application file for complete search history.

(56) References Cited

U.S. PATENT DOCUMENTS 4,992,948 A  2/1991 Pilland et al.
5,117,169 A *  5/1992 Kakino ................ G05B 19/401
                                                318/570
(Continued)

FOREIGN PATENT DOCUMENTS

CN  201579650 U  9/2010
CN  102402197 A  4/2012
(Continued)

*Primary Examiner* — M. N. Von Buhr
(74) *Attorney, Agent, or Firm* — Henry M. Feiereisen LLC

(57) ABSTRACT

A production system includes a production machine and a control device for generating a control command for the production machine based on production data. The control device includes an analysis apparatus to decide based on a prespecified quality criterion, whether an activated functionality, which is integrated in the control device, or an alternative functionality, which is provided in a database outside the control device or in unactivated form in the control device, is used to translate the production data into the specific control command, so that the control command which is output by the control device is replaced by a control command more suitable to satisfy the prespecified quality criterion. The control device is configured to save a control file for the alternative functionality, to provide the control file for a translation, and to provide the alternative functionality for a prespecified period and/or for a predetermined number of useful cycles.

8 Claims, 1 Drawing Sheet

(52) U.S. Cl.
CPC .............. *G05B 2219/24165* (2013.01); *G05B 2219/35012* (2013.01); *Y02P 90/265* (2015.11)

(56) References Cited

U.S. PATENT DOCUMENTS

| | | | | |
|---|---|---|---|---|
| 6,006,141 | A * | 12/1999 | Yoneda | G05B 19/4148 700/169 |
| 7,548,795 | B2 * | 6/2009 | Sagasaki | G05B 19/4155 318/569 |
| 8,032,605 | B2 * | 10/2011 | Brown | G05B 19/4185 700/1 |
| 10,162,317 | B2 * | 12/2018 | Toh | G05B 19/41805 |
| 2003/0163208 | A1 * | 8/2003 | Sugiyama | G05B 19/40938 700/28 |
| 2005/0171629 | A1 * | 8/2005 | Suh | G05B 19/4093 700/159 |
| 2006/0161290 | A1 * | 7/2006 | Takahashi | G05B 19/40937 700/182 |
| 2007/0067059 | A1 * | 3/2007 | Travez | B23Q 15/12 700/160 |
| 2007/0150089 | A1 * | 6/2007 | Dolansky | G05B 19/128 700/173 |
| 2009/0164039 | A1 * | 6/2009 | Jung | G05B 19/0426 700/117 |
| 2009/0198366 | A1 * | 8/2009 | Schneider | G05B 19/4069 700/110 |
| 2010/0138018 | A1 * | 6/2010 | Bretschneider | G05B 19/4093 700/97 |
| 2014/0257545 | A1 * | 9/2014 | Tanna | G06Q 10/06393 700/108 |
| 2015/0362916 | A1 * | 12/2015 | Mansouri | G05B 19/4188 700/19 |
| 2016/0103447 | A1 * | 4/2016 | Sinn | G05B 19/4068 700/182 |
| 2016/0209833 | A1 | 7/2016 | Distler | |
| 2016/0224006 | A1 * | 8/2016 | Otomo | G05B 19/18 |

FOREIGN PATENT DOCUMENTS

| | | |
|---|---|---|
| DE | 10 2012 000 815 A1 | 9/2012 |
| EP | 1 369 758 A1 | 12/2003 |
| EP | 1 677 168 A1 | 7/2006 |
| JP | 2009274160 A | 11/2009 |
| WO | WO 2013013580 A1 | 1/2013 |

* cited by examiner

PRODUCTION SYSTEM HAVING ADDITIONAL FUNCTIONALITY, AND OPERATING METHOD

CROSS-REFERENCES TO RELATED APPLICATIONS

This application is the U.S. National Stage of International Application No. PCT/EP2015/078267, filed Dec. 2, 2015, which designated the United States and has been published as International Publication No. WO 2016/113033 A1 and which claims the priority of European Patent Application, Serial No. 15151294.4, filed Jan. 15, 2015, pursuant to 35 U.S.C. 119(a)-(d).

BACKGROUND OF THE INVENTION

The present invention relates to a production system having a production machine and a control device for generating specific control commands for the production machine on the basis of production data. The present invention also relates to a method for operating such a production system.

Here, the term "production machine" should be understood to mean every machine that performs a manufacturing or production process independently or is at least integrated in such a process. A typical example of such a production machine would be a machine tool with which workpieces are machined by means of one or more tools. These can, for example, be understood to include lathes, milling machines or the like.

Production machines can also relate to machines that only perform movements in an automated manner. These include, for example, robots that carry out mechanical work and are controlled by control programs. Similarly, systems representing a group consisting of a plurality of devices can be considered to be production machines. Such systems are also typically controlled by control programs in order, for example, to perform production in an automated manner.

The quality, functionality and performance of production systems are increasingly determined by their control software. Although software is newly and further developed in every shorter development cycles, nowadays machines are often unable to derive any increased benefit from this.

Many production machines are so-called "CNC machines" (computerized numerical control). These machines are controlled by a machine program or CNC program. Such machine programs are generally manufacturer-specific.

Workpieces are typically designed with the aid of CAD programs. CAM systems for computer-aided manufacturing convert the data of a CAD design into CNC programs taking into account specific tools, speeds, feed functions and the like. Generally, a postprocessor is also required to bring such a CNC program into the specific form required by a specific production machine.

I.e. a production machine has, for example, an internal CNC control. As already indicated above, the lathe or production machine also receives its control commands from a control device outside the production machine. In the case of machine tools, this control device typically includes a CAD system, a CAM system and, if applicable, a postprocessor. Together with the control device, the production machine then forms a production system.

Such a production system is subject to constant changes. On the one hand, the control of the production machine (for example CNC control) is continuously updated. In addition, computer-aided systems are repeatedly improved and brought up-to-date during production planning. In addition, individual systems are frequently individually customized. In this case, individual systems are in each case provided with suitable software. In this context, it is also possible for individual software components to be released in accordance with specific user requirements. All these possibilities for updating and upgrading means that a great deal of effort is required to achieve optimum process results. It would desirable to optimize the interaction of individual systems as early as the production planning stage (control and data processing before the production machine). This would enable the laborious task of adapting the CAM and postprocessor for the respective machines to be avoided.

SUMMARY OF THE INVENTION

Therefore, it is the object of the present invention to provide a production system with which improved production quality can be achieved. The object is also to provide a corresponding method.

According to the invention, this object is achieved by a production system with
  a production machine and
  a control device for generating specific control commands for the production machine on the basis of production data, wherein
  the control device comprises an analysis apparatus, which is designed to decide, based on a prespecified quality criterion, whether an activated functionality, which is already integrated in the control device, is used to translate the production data into the specific control commands or an alternative functionality, which is provided in a database outside the control device or in unactivated form in the control device,
  wherein the control device is designed to save a control file for the alternative functionality and to provide said control file for the translation,
  wherein the control device is designed to provide the alternative functionality temporarily only.

Also provided according to the invention is a method for operating a production system, which comprises a production machine and a control device for generating specific control commands for the production machine on the basis of production data by
  translating the production data into the specific control commands and
  deciding based on a prespecified quality criterion whether an activated functionality which is already integrated in the control device is used to translate the production data into the specific control commands or an alternative functionality, which is provided in a database outside the control device or in unactivated form in the control device,
  designing the control device to save a control file for the alternative functionality and to provide said control file for the translation,
  designing the control device to provide the alternative functionality temporarily only.

Therefore, advantageously, the control device, which is part of so-called production planning and, in the case of machine tools, is typically embodied as a CAM device, checks whether it is not possible for the production system to achieve a better quality. This is implemented in that a check is performed as to whether it is not possible for the control commands output by the control device for the production machine to be replaced by better control commands.

To this end, a check is performed as to whether it is not possible to optimize the translation of the production data into the control commands (for example the translation of CAD data into CAM output). This is for example the case when a corresponding functionality has been updated, improved or speeded up by the manufacturer of the control device. Alternatively or additionally, in this case, it is also possible to check whether it is not possible to achieve higher quality by releasing another or additional functionality. For example, it would be possible to release an additional functionality in order to be able to obtain a higher surface quality.

The control device is designed to save a control file for the alternative functionality and to provide said control file for the translation. This has the advantage that a respective control file can be stored in the control device and hence the control device is not reliant on a complex data exchange for example with an external database.

Moreover, the control device is designed to provide the alternative functionality temporarily only. This means that the alternative functionality, i.e. the functionality that was not initially available or activated in the control device from the beginning, is activated and deactivated in a defined manner. Here, activation includes a case in which the corresponding file is saved and made available. It is obviously also alternatively possible for a file that has already been saved to be activated or made available solely by setting an activation bit for example. On the corresponding deactivation, the activation bit is then reset once again. However, deactivation can also designate a process in which a functionality or its file is deleted or uninstalled.

The production machine is preferably a machine tool. In this case, the control device supplies, for example, tool paths as control commands to the machine tool. Such machine tools can then optionally be optimized for manufacturing purposes, for example by Plug&Play. This would be particularly advantageous for example for milling machines and lathes. In particular in the case of small-batch production processes, this enables optimization in the production process to be implemented relatively quickly.

The prespecified quality criterion can relate to production precision. For example, it can be desirable to reduce surface roughness and in this respect to provide corresponding functionalities for the control device. However, production precision can also be improved by reducing tolerances. Here once again, optionally alternative functionalities can be provided that are suitable to use for the respective purpose.

However, the prespecified quality criterion can also relate to the production rate. The production rate is another essential process parameter that is always subject to optimization. For example, it is obviously advantageous for the axles of a machine tool to be moved more quickly on empty runs. New tools can also enable optimization of the production rate so that then, in some circumstances, it is necessary to install an additional functionality for a new tool in order to increase the production rate.

With one exemplary embodiment, the control device is designed to provide the alternative functionality for a predetermined duration. This means that the alternative functionality is then activated or available for this predetermined duration. Outside this duration, this alternative functionality is not available for the control device. Thus, for example, a time-limited license can be issued for a specific functionality.

According to another variant, the control device can be designed to provide the alternative functionality for a predetermined number of useful cycles. In this case, a useful cycle is defined by that fact that use is made of the respective functionality or the result thereof. For example, it is, for example, possible for the number of times production data is translated into control commands with the respective functionality to be limited. Alternatively, it is also possible to limit the number of times the production machine is permitted to perform a production process. In this case, a production process can consist in the manufacture of exactly one product or also in the manufacture of a batch of products.

The above-listed features for the development of the production system according to the invention can also be used to develop the method according to the invention. The respective functional features described should then be interpreted as being method steps.

BRIEF DESCRIPTION OF THE DRAWING

The present invention is now explained in more detail with respect to the attached drawings, which show.

DETAILED DESCRIPTION OF PREFERRED EMBODIMENTS

The exemplary embodiments described in more detail below represent preferred embodiments of the present invention. In this case, it should be noted that the individual features can be implemented not only in the combinations described but also alone or in other technical advisable combinations.

Figure 1:
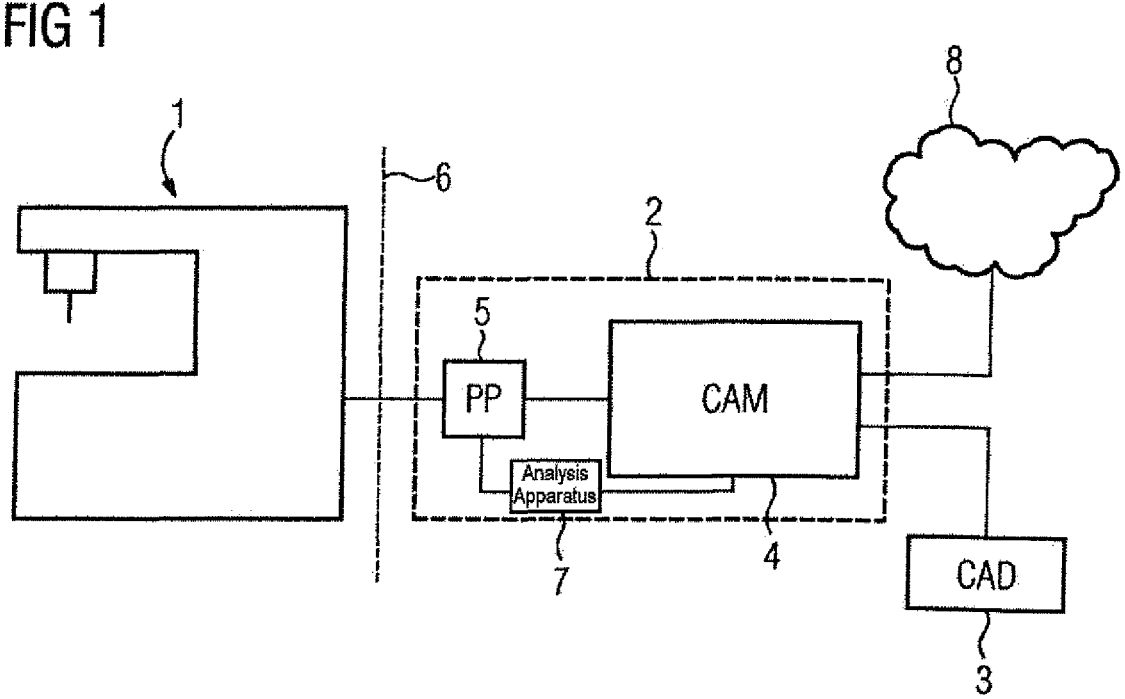
FIG. 1 a block diagram of the basic construction of a production system.

FIG. 1 shows the basic construction of a production system by way of example. This exemplary production system has a milling machine 1 as a production machine, for example. It also has a control device 2 for generating specific control commands for the production machine on the basis of production data. The control device receives such production data for example from a graphics program, for example a CAD system 3.

Although a milling machine was selected as the production machine 1, in the example in FIG. 1, it can be any other machine tool, such as, for example, a lathe, drilling machine and the like. However, the production machine can also be any other type of machine with which products can be made. For example, it can also be an injection molding machine, a robot (for example a welding robot) or any other machine for producing or handling workpieces.

Such a production machine 1 has a data input via which the production data can be transmitted to a control inside the machine (in this context, in the case of machine tools, this is often called a CNC control). This production data represents for example, tool paths and is used to control the machine's axles. The control device 2 prepares the graphics data of the CAD system 3 selected here by way of example such that, for example, tool paths for the CNC control are available at its output. The corresponding conversion is, for example, performed by a CAM system 4 of the control device 2. The output data from standardized CAM systems is frequently not suitable for directly actuating a production machine 1. Therefore, the control device 2 optionally also has a so-called postprocessor 5 capable of converting standardized or conventional output data sets of a CAM system 4 into machine-specific data sets.

In FIG. 1, a dividing line 6 is drawn between the production machine 1 and the control device 2. This symbolizes the division between the production machine 1 that is actually in operation on the one hand and production planning on the other. The control device 2 and in particular the CAM system 4 and the postprocessor 5 should be considered to be part of production planning.

Therefore, the control device 2 has also the aforementioned integrated functionality for converting the production data, for example from the CAD system 3, into a machine program with which the production machine 1 is directly controlled. The system can, for example, use this integrated functionality to create a surface or a contour with a specific quality. For example: the user wishes to improve the surface quality of a new batch of products. The user knows, for example, that the production machine 1 is, in principle, capable of achieving such an improved surface quality. However, it is not possible to achieve this high quality with the integrated functionality for translating the production data into the specific control commands for the production machine 1. Therefore, the user may be given the option of releasing an alternative functionality in the control device 2 so that the improved surface quality is achieved. While the first-named integrated functionality is activated and actually used, the second-named alternative functionality is not (yet) activated.

The control device 2 has now has an analysis apparatus 7 with which the integrated functionality can be compared with the alternative functionality. The comparison criterion is a prespecified quality criterion. This quality criterion can, for example, be the roughness, the precision, the tolerance or the production rate. If the analysis apparatus 7 establishes that the quality criterion is not achieved with the integrated functionality, but is achieved with the alternative functionality, the control device implements the alternative functionality optionally fully automatically or optionally also semi-automatically.

For example, several functionalities for translating the production data into the specific control commands are already filed in the control device 2. One of these functionalities is then activated for a specific type of production system. If the alternative functionality is now activated or released, it is, for example, necessary for a corresponding activation bit to be set and the activation bit of the original functionality to be reset. This means that one functionality is deactivated and the other functionality is activated. The activation of a functionality is, for example, only possible, if a corresponding license is held. This can, for example, be obtained from the manufacturer free of cost. With the license, the user receives, for example, an activation code, with the alternative functionality can be released.

Alternatively, the control device 2 can also automatically "make inquires" in an external database, for example the Internet, to determine which functionalities are available in place of the integrated functionality in order to satisfy the prespecified quality criterion. The analysis apparatus 7 can then decide again whether to use the integrated functionality or the alternative functionality from the Internet 8. As with the first embodiment, the decision can also be reached on the basis that the integrated function is used if the quality criterion is satisfied. Then, it is not necessary for the alternative functionality to be activated or downloaded or the like. If the quality criterion is not reached by the integrated functionality, but is reached by the alternative functionality, the latter is downloaded or activated and used.

According to another decision-making algorithm, the integrated functionality is compared directly with the alternative functionality that has not yet been downloaded or activated and whichever the two functionalities delivers the better result is the one used.

The functionalities addressed here can not only comprise translation algorithms for translating production data into specific control commands but also additional information, for example from the manufacturer (OEM information). This information relates, for example, to the optimization of previous systems. For example, an alternative functionality can be formed by an integrated functionality together with additional information from the OEM.

Figure 2:
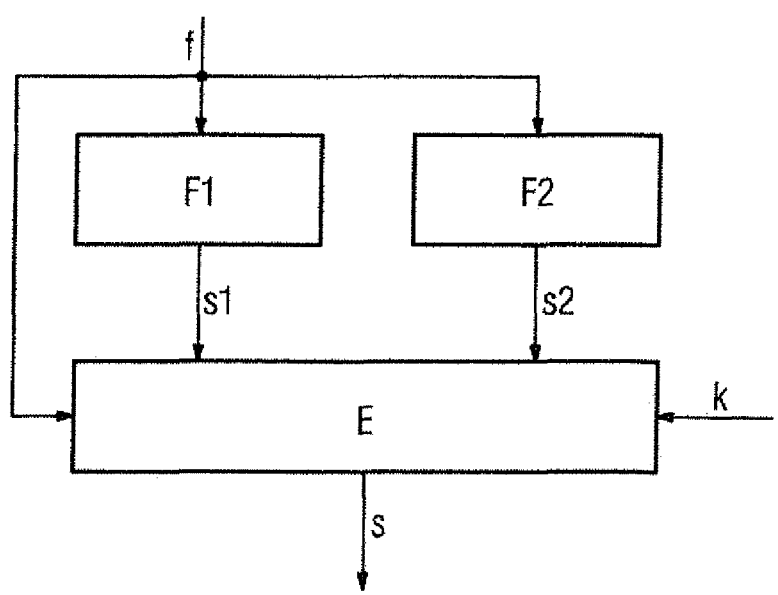
FIG. 2 a sequence diagram of a method according to the invention.

FIG. 2 shows an exemplary embodiment of an operating method for a production system according to the method comprising a production machine and a control device for generating specific control commands for the production machine on the basis of production data. The production data f is fed to two functionalities or translation blocks F1 and F2. The translation block F1 implements the integrated activated functionality to translate the production data f into specific control commands s1. The parallel translation block F2 implements the alternative functionality to translate the production data f into specific control commands s2. A downstream decision-making block E now decides which of the control commands s1 or s2 are to be used as control commands s for actual implementation. The decision-making block E based the decision on a prespecified quality criterion k. The production data f is optionally also used for the decision. With respect to further details, reference is made to the functional relationships in the exemplary embodiment shown in FIG. 1.

If it is established that the integrated functionality F1 has already achieved the quality criterion k, it is possible to dispense with further translation according to functionality F2. Then, there is no need to activate or download the latter. The control commands s1 are used as the control commands s to be actually used.

If the quality criterion k is not achieved with the integrated functionality F1, but is achieved with the alternative functionality F2, the control commands s2 are used as the control commands s to be actually used.

However, it is also possible for a decision to be taken in the decision-making block E on the basis of which of the two functionalities F1 and F2 better satisfies the prespecified quality criterion k.

Then, the corresponding control commands are actually used. The following is a brief description of very specific embodiments. For example, with access to online databases and information on the CNC software version used including additional OEM information, the CAM system is able automatically to recognize that, for example, machining cycles (for example for surfaces, edges, pockets etc.) do not meet the state-of-the-art or that the machining can be organized more effectively with an additional option (for example spline interpolation). This enables the best result to be achieved in a continuous process in a production planning chain with little effort. In particular, this enables start-of-the-art machining cycles (including any OEM information) and the most effective CNC functions to be used.

It is particularly advantageous for the CAM system to be connected to a database in order to be able to perform version checks, option checks etc. on the basis of the information on the CNC software version of the machine, an OEM cycle version etc. and forward this knowledge to the CAM operator. Hence, the process chain is always completely up-to-date and offers the most effective production possibilities.

The invention claimed is:

1. A production system, comprising:
a production machine; and
a control device for generating specific control commands for the production machine based on production data, said control device including an analysis apparatus configured to decide based on a prespecified quality criterion selected from a production precision and a production rate, whether an activated functionality, which is integrated in the control device, or an alternative functionality, which is provided in a database outside the control device or in unactivated form in the control device, is used to translate the production data into the specific control commands when a corresponding functionality in the database outside the control device or in unactivated form in the control device is updated, improved or speeded up,
said control device being configured to
save a control file for the alternative functionality,
to provide the control file for translation of the production data,
to provide the alternative functionality only for a prespecified period or for a prespecified number of production cycles, and
to fully-automatically or semi-automatically control the production machine with the alternative functionality when the analysis apparatus determines that the prespecified quality criterion is unattainable with the integrated functionality, but is attainable with the alternative functionality.

2. The production system of claim 1, wherein the production machine is a machine tool.

3. The production system of claim 2, wherein the specific control commands include a tool path of the machine tool.

4. The production system of claim 1, wherein an activation bit is set for activating the alternative functionality and an activation bit of the integrated functionality is reset, wherein a functionality is activated only in presence of a corresponding license.

5. The production system of claim 4, wherein the corresponding license is activated by a user of the production system.

6. A method for operating a production system, said method comprising:
translating production data into specific control commands generated by a control device for a production machine;
deciding by an analysis apparatus based on a prespecified quality criterion selected from a production precision and a production rate, whether an activated functionality, which is integrated in the control device, or an alternative functionality, which is provided in a database outside the control device or in unactivated form in the control device, is used to translate the production data into the specific control commands when a corresponding functionality in the database outside the control device or in unactivated form in the control device is updated, improved or speeded up;
with the control device
saving a control file for the alternative functionality,
providing the control file for translation of the production data;
providing the alternative functionality for a prespecified period or for a prespecified number of production cycles; and
fully-automatically or semi-automatically controlling the production machine with the alternative functionality when the analysis apparatus determines that the prespecified quality criterion is unattainable with the integrated functionality, but is attainable with the alternative functionality.

7. The method of claim 6, further comprising activating the alternative functionality by setting a corresponding activation bit and by resetting an activation bit of the integrated functionality, wherein a functionality is activated only in presence of a corresponding license.

8. The method of claim 7, wherein the corresponding license is activated by a user of the production system.

* * * * *